Patented July 18, 1939

2,166,557

UNITED STATES PATENT OFFICE 2,166,557

COATING COMPOSITION

Sylvia M. Stoesser and Arnold R. Gabel, Midland, Mich., assignors to The Dow Chemical Company, Midland, Mich., a corporation of Michigan No Drawing. Application July 1, 1937, Serial No. 151,546

5 Claims. (Cl. 260—36)

The present invention relates to compositions comprising polystyrene, and particularly to liquid compositions suitable for lacquers and the like.

Polystyrene is in many respects well suited for use in coating compositions. It is soluble in common hydrocarbon solvents and can be applied in fairly concentrated solutions as a colorless protective film on metal, wood, etc. However, films of polystyrene do not adhere firmly to metal surfaces and tend to check and even pull loose when the metal is bent, and to become brittle and crack on ageing. Furthermore, such films are not wholly impervious to aqueous solutions; that is, metal objects, even though coated with polystyrene, tend to corrode when in contact with aqueous solutions of electrolytes.

We have now discovered that, when an aryloxy-aliphatic acid ester of a glycol monoether is incorporated as a plasticizer in coating compositions comprising polystyrene, the plasticized polystyrene provides a strongly adherent protective finish for metals, etc., which exhibits little or no tendency to check or crack and is substantially impervious to aqueous solutions.

The invention, then, consists in the new polystyrene compositions hereinafter fully described and particularly pointed out in the claims.

In preparing polystyrene compositions in accordance with the invention we prefer to use the tough resinous material produced by the polymerization of styrene at temperatures not exceeding 160° C. or thereabouts. However, other forms of polymerized styrene may also be utilized.

Among the aryloxy-aliphatic acid esters of glycol monoethers which may be employed as plasticizers with polystyrene are the compounds; beta-methoxy-ethylene glycol phenoxy-acetate, beta-ethoxy-ethylene glycol phenoxy-acetate, beta-butoxy-ethylene glycol phenoxy-acetate, beta-ethoxy-ethylene glycol 2-chlorophenoxy-acetate, beta-2-chlorophenoxy-ethylene glycol cresoxy-acetate, benzoxy-butylene glycol phenoxy-propionate, propoxy-propylene glycol beta-naphthoxy-butyrate, etc.

Although in preparing polystyrene lacquers in accordance with the invention, the proportions of polystyrene, plasticizer and solvent may be varied widely, in practice we prefer to dissolve one part by weight of polystyrene and 0.1–1.0 part, preferably 0.2–0.5 part, of an aryloxy-aliphatic acid ester of a glycol monoether in 5 to 20 parts of a suitable thinner. As thinner any relatively volatile organic liquid in which both polystyrene and the plasticizer are soluble, e. g., benzene, toluene, xylene, ethylbenzene, or mixtures thereof, may be employed. Ordinarily a mixture of solvents of different boiling points is preferred. Instead of dissolving the polystyrene in the solvent, the unpolymerized material may first be dissolved and thereafter polymerized in solution, the plasticizer being added either before or after the polymerization.

The polystyrene lacquers just described are useful for application to metals, wood, etc., either on the bare surface or over a suitable undercoat, in any convenient way, such as spraying, brushing on, or dipping. They may, if desired, be modified by incorporating therein dyes, pigments, fillers, drying oils, other plasticizers, etc., to obtain varnishes and enamels of various types.

The following examples illustrate a number of ways in which the principle of the invention has been employed, but are not to be construed as limiting the scope thereof:

Example 1

A lacquer having the following composition was prepared:

| | Parts by weight |
|---|---|
| Polystyrene | 7 |
| Beta-ethoxy-ethylene glycol 2-chloro-phenoxy-acetate | 3 |
| Benzene | 13.5 |
| Toluene | 36.0 |
| Xylene | 40.5 |

Clean metal strips were dipped in the lacquer, allowed to drain, and dried in an air bath at 65° C.

When these coated metal strips were bent through a 180° angle over a ¼-inch rod and then back to their original flat position, the plasticized polystyrene films did not crack or break away from the metal surface and showed little or no checking. Also, when acidic copper sulfate solution was placed on the metal test strips on both the flat and the bent positions, there was no evidence of any action, even after three hours.

However, when strips of metal dipped in a polystyrene lacquer not containing the plasticizer were bent, the finishes checked badly. Moreover, when such strips were tested with an acidic copper sulfate solution, bright metallic copper plated out within a few minutes on both the bent and unbent surfaces.

Similar lacquers were also prepared using respectively 1 part and 2 parts of beta-ethoxy-ethylene glycol 2-chloro-phenoxy-acetate per 9 parts and 8 parts of polystyrene, respectively. Polystyrene films from these lacquers likewise showed excellent corrosion resistance and adhesion to metal surfaces.

Example 2

The following lacquer was prepared:

| | Parts by weight |
|---|---|
| Polystyrene | 6 |
| Beta-butoxy-ethylene glycol phenoxy-acetate | 4 |
| Benzene | 9 |
| Toluene | 54 |
| Ethylbenzene | 27 |

Metal test strips were dipped in the lacquer, dried, and tested as in Example 1. The polystyrene films did not break or crack on bending, and did not give evidence of any action on exposure to acidic copper sulphate solution.

Example 3

A lacquer was prepared as in Example 2, except that beta-ethoxy-ethylene glycol phenoxy-acetate was substituted for the plasticizer of Example 2. Films of this lacquer also showed no cracking or breaking on bending and had good corrosion resistance.

In addition to their use as plasticizers for the polystyrene lacquers hereinbefore described, aryloxy-aliphatic acid esters of glycol monoethers may advantageously be employed in other polystyrene compositions, e. g., in cast or molded articles, to reduce the brittleness and improve the tensile strength thereof.

Other modes of applying the principle of our invention may be employed, change being made as regards the ingredients herein disclosed, provided the ingredients stated by any of the following claims or the equivalent of such stated ingredients be employed.

We therefore particularly point out and distinctly claim as our invention:

1. A composition comprising polystyrene plasticized with beta-ethoxy-ethylene glycol 2-chloro-phenoxy-acetate.

2. A composition comprising polystyrene plasticized with beta-butoxy-ethylene glycol phenoxy acetate.

3. A composition comprising polystyrene plasticized with beta-ethoxy-ethylene glycol phenoxy acetate.

4. An organic plastic composition comprising polystyrene plasticized with an ester having the general formula $$R_1\text{—}O\text{—}(CH_2)_n\text{—}COOR_2$$

wherein $R_1$ is a substituent selected from the group consisting of aromatic hydrocarbon and chloro-aromatic hydrocarbon radicals, $R_2$ is the residue of a mono-glycol mono-ether, and $n$ is an integer, to decrease the permeability and increase the adhesiveness thereof.

5. A coating composition comprising a solvent and polystyrene plasticized with an ester having the general formula $$R_1\text{—}O\text{—}(CH_2)_n\text{—}COOR_2$$

wherein $R_1$ is a substituent selected from the group consisting of aromatic hydrocarbon and chloro-aromatic hydrocarbon radicals, $R_2$ is the residue of a mono-glycol mono-ether, and $n$ is an integer.

SYLVIA M. STOESSER.
ARNOLD R. GABEL.